(12) United States Patent
Pizano et al.

(10) Patent No.: US 9,572,416 B2
(45) Date of Patent: Feb. 21, 2017

(54) TURF GROOMER FOR NATURAL AND ARTIFICIAL TURF SURFACES

(75) Inventors: Miguel A. Pizano, Eden Prairie, MN (US); Benjamin A. Street, Northfield, MN (US); Cal N. Kosieracki, St. Louis Park, MN (US); Andrew J. Kjolhaug, Rosemount, MN (US)

(73) Assignee: The Toro Company, Bloomington, MN (US)

( * ) Notice: Subject to any disclaimer, the term of this patent is extended or adjusted under 35 U.S.C. 154(b) by 1119 days.

(21) Appl. No.: 12/877,631

(22) Filed: Sep. 8, 2010

(65) Prior Publication Data

US 2012/0096661 A1   Apr. 26, 2012

(51) Int. Cl.
| | |
|---|---|
| *A46B 9/02* | (2006.01) |
| *A01B 45/00* | (2006.01) |
| *A01G 1/12* | (2006.01) |
| *A46B 13/00* | (2006.01) |

(52) U.S. Cl.
CPC .................. *A46B 9/02* (2013.01); *A01B 45/00* (2013.01); *A01G 1/12* (2013.01); *A46B 13/00* (2013.01)

(58) Field of Classification Search
CPC ........... A46B 9/02; A46B 13/00; A01B 45/00; A01G 1/12
USPC ........ 172/29, 63, 199, 272, 439, 612; 15/78; D15/27
See application file for complete search history.

(56) References Cited

U.S. PATENT DOCUMENTS

| | | | | | |
|---|---|---|---|---|---|
| 741,487 | A | * | 10/1903 | Hailey | 172/34 |
| 1,421,060 | A | * | 6/1922 | Brook | 172/468 |
| 1,544,662 | A | * | 7/1925 | Frost et al. | 15/78 |
| 1,546,071 | A | * | 7/1925 | Lipp | 15/87 |
| 1,566,194 | A | * | 12/1925 | Freeman | 15/78 |
| 1,674,306 | A | * | 6/1928 | Shaw | 15/78 |
| 1,833,878 | A | * | 11/1931 | Adams | 172/199 |
| 1,997,248 | A | * | 4/1935 | Densberger | 172/688 |
| 2,042,405 | A | * | 5/1936 | Knudson | 172/189 |
| 2,267,916 | A | * | 12/1941 | Hershey | 15/22.2 |
| 2,300,192 | A | * | 10/1942 | Bradley | 15/78 |
| 2,962,946 | A | * | 12/1960 | Neff | 404/101 |
| 3,588,145 | A | * | 6/1971 | Thompson | 280/156 |
| 4,210,210 | A | * | 7/1980 | Ankenman | 172/272 |
| 4,407,038 | A | * | 10/1983 | Haase | 15/105 |

(Continued)

FOREIGN PATENT DOCUMENTS

| | | |
|---|---|---|
| GB | 2187372 | 9/1987 |
| GB | 2258147 | 3/1993 |

*Primary Examiner* — Jamie L McGowan
(74) *Attorney, Agent, or Firm* — James W. Miller (57) ABSTRACT

A groomer for turf surfaces includes a groomer frame that mounts a first style of grooming brush for use on an artificial turf surface and a second style of grooming brush for use on a natural turf surface. The first style of grooming brush comprises a brush formed by spaced brush walls with each brush wall having a substantially single row of brush bristles with no bristles being placed between the brush walls. The second style of grooming brush is that similar to a push broom where the brush bristles are packed across the width of the brush head. When configured for artificial turf surfaces, a front row of scarifying spring tines helps the trailing brushes to level out the infill material and the attitude of the groomer frame can be tilted tail down to put more downpressure on the infill material. A debris remover attached to the rear of the frame can pick up and hold metallic debris that is often found in the turf surface.

20 Claims, 12 Drawing Sheets

(56) References Cited

U.S. PATENT DOCUMENTS

| | | | |
|---|---|---|---|
| 4,747,174 A * | 5/1988 | Hightower | 15/78 |
| 4,989,676 A * | 2/1991 | Rogers | 172/438 |
| 5,018,587 A * | 5/1991 | Gandrud et al. | 172/612 |
| 5,218,732 A * | 6/1993 | Pettigrew et al. | 15/4 |
| 5,285,904 A * | 2/1994 | Haase | 209/215 |
| 5,477,927 A * | 12/1995 | Figura | 172/29 |
| 5,535,831 A * | 7/1996 | Jacobs | 172/29 |
| 5,547,030 A * | 8/1996 | Takayama et al. | 172/30 |
| 5,621,940 A * | 4/1997 | Lewis et al. | 15/78 |
| 5,833,013 A * | 11/1998 | Davis | 172/612 |
| 5,918,684 A * | 7/1999 | Tozer | 172/199 |
| 6,016,584 A * | 1/2000 | Melroe | 15/78 |
| 6,257,345 B1 * | 7/2001 | Tozer | 172/199 |
| 6,655,469 B1 * | 12/2003 | Davis | 172/622 |
| 6,659,191 B1 * | 12/2003 | Humphrey | 172/40 |
| 6,945,021 B2 * | 9/2005 | Michel | 56/249 |
| D514,597 S * | 2/2006 | Lynch | D15/27 |
| 7,065,947 B1 * | 6/2006 | Street et al. | 56/371 |
| 7,464,528 B1 * | 12/2008 | Street et al. | 56/371 |
| 8,209,809 B2 * | 7/2012 | Davis et al. | 15/52.1 |
| 2002/0104178 A1 * | 8/2002 | Truan et al. | 15/78 |
| 2003/0226671 A1 * | 12/2003 | Davis | 172/707 |
| 2004/0148718 A1 * | 8/2004 | Michel | 15/78 |
| 2009/0205157 A1 * | 8/2009 | Allaway | 15/345 |

\* cited by examiner

TURF GROOMER FOR NATURAL AND ARTIFICIAL TURF SURFACES

TECHNICAL FIELD

This invention relates to a device for conditioning or grooming a turf surface to maintain or restore the appearance or function of the turf surface.

BACKGROUND OF THE INVENTION

Turf surfaces are commonly used as the playing surfaces for athletic or recreational activities, such as golf courses, football fields, baseball fields, and the like. Traditionally, turf surfaces at these venues comprised natural turf surfaces in which the soil or dirt of the ground had an upper layer of grass growing out of the soil or dirt. Obviously, such natural turf surfaces were restricted to outdoor environments, had to have adequate amounts of sunshine and water in order to keep the grass alive, and the grassy top layer had to be periodically cut or mowed to keep the height of the grass at a desired level. Accordingly, the costs to maintain a natural turf surface could be fairly substantial.

In more recent years, artificial turf surfaces have been developed that more closely resemble the look and feel of natural turf surfaces than early versions of artificial turf surfaces. These more recent artificial turf surfaces comprise a backing material that is laid atop the ground with the backing material having upstanding ribbons of artificial fibers that resemble blades of grass. In addition, such turf surfaces have one or more layers of particulate material placed atop the backing material and spread out over the backing material to surround the grass like fibers. The layers of particulate material can comprise a bottom layer of intermixed hard sand particles and resilient rubber granules and a top layer of resilient rubber granules as disclosed in U.S. Pat. No. 7,306,838. One brand of such an artificial turf surface that is available today is FieldTurf.

Turf surfaces, whether natural or artificial, have different grooming needs to keep them looking and playing their best. For example, a natural turf surface is often treated with a particulate top dressing material that must be spread or leveled out evenly in order to be most effective. In the morning, a natural turf surface is often heavily laden with dew. After mowing, a natural turf surface might be littered with clumps of grass clippings. It has been known in the art to pull a groomer across a natural turf surface to address these various needs, the groomer having a plurality of brushes that smooth the natural turf surface to smooth out top dressing material, to remove dew, or to smooth out and hide the grass clippings in the uncut grass. U.S. Pat. No. 6,655,469 shows a known prior art groomer.

Artificial turf surfaces also need to be groomed, but for somewhat different reasons. There obviously will never be any grass clippings lying atop such a turf surface. But, the layers of particulate material in the artificial turf surface, which layers will be collectively referred to herein as the infill material, can and do get disturbed or redistributed by the action of those who are playing or moving on the turf surface. Thus, the infill material over time gets redistributed into high spots and low spots. When this happens, it would be desirable in such turf surfaces to level out the infill material so that it has a more uniform depth across the extent of the turf surface.

Various attempts have been made to groom artificial turf surfaces using the same types of groomers that have been used for natural turf surfaces. Basically, the same types of brushes and spring tines that are towed over natural turf surfaces have been towed over artificial turf surfaces. For example, GreensGroomer Worldwide, Inc., the assignee of the '469 patent referred to above, sells a groomer for use on natural turf surfaces that has a brush and spring tine design substantially the same as the groomer that is sold for use on artificial turf surfaces.

However, the Applicants herein have discovered that substantially better results can be obtained when grooming artificial turf surfaces if a different style of brush and a different arrangement of spring tines are used. In addition, the Applicants have provided a single groomer that is convertible between use on natural turf surfaces and use on artificial turf surfaces so that duplicate pieces of equipment are not needed. Accordingly, the groomer disclosed and claimed in this application is a further advance in the art relating to the grooming of turf surfaces.

SUMMARY OF THE INVENTION

One aspect of this invention relates to a turf groomer for an artificial turf surface having a backing material that is laid atop the ground with the backing material having upstanding ribbons of artificial fibers that resemble blades of grass. The backing material has granular or particulate infill material placed atop the backing material substantially filling in the spaces between the artificial fibers. The groomer comprises a groomer frame which is movable over the artificial turf surface to traverse the artificial turf surface. The groomer frame has a front and a rear taken with respect to a forward direction of motion of the groomer frame over the artificial turf surface. At least one grooming brush is carried on the groomer frame depending downwardly from the grooming frame with the grooming brush extending down at least partially into and engaging with the infill material of the artificial turf surface. The grooming brush extends at least partially laterally relative to the forward direction of motion of the groomer frame. The grooming brush comprises a first brush wall comprising a substantially single row of brush bristles with top ends of the brush bristles being substantially closely packed together and with lower portions of the brush bristles fanning out as the brush bristles extend downwardly from their packed together top ends. A second brush wall is provided on the grooming brush which is substantially identical to the first brush wall and which is parallel to but spaced away from the first brush wall by a gap. The gap between the brush walls is large enough so that the first and second brush walls act substantially independently of one another on the infill material.

Another aspect of this invention relates to a groomer which is convertible for grooming both a natural turf surface and an artificial turf surface. The natural turf surface comprises soil or dirt with an upper layer of growing natural grass. The artificial turf surface has a backing material that is laid atop the ground with the backing material having upstanding ribbons of artificial fibers that resemble blades of grass. The backing material has granular or particulate infill material placed atop the backing material to substantially fill in the spaces between the artificial fibers. The groomer comprises a groomer frame which is movable over the artificial turf surface to traverse the turf surface. A plurality of first grooming brushes is carried on the groomer frame for use in grooming the artificial turf surface. A plurality of second grooming brushes can be installed on the groomer frame in place of the first grooming brushes for use in grooming the natural turf surface. The first and second grooming brushes have different configurations of brush bristles. Each second grooming brush is in the style of a push broom with bristles closely packed across both a length and width of the brush. Each first grooming brush has bristles closely packed across the length thereof but having open interior portions across the width thereof where there are no brush bristles.

BRIEF DESCRIPTION OF THE DRAWINGS

This invention will be described more completely in the following Detailed Description, when taken in conjunction with the following drawings, in which like reference numerals refer to like elements throughout.

DETAILED DESCRIPTION

Figure 1:
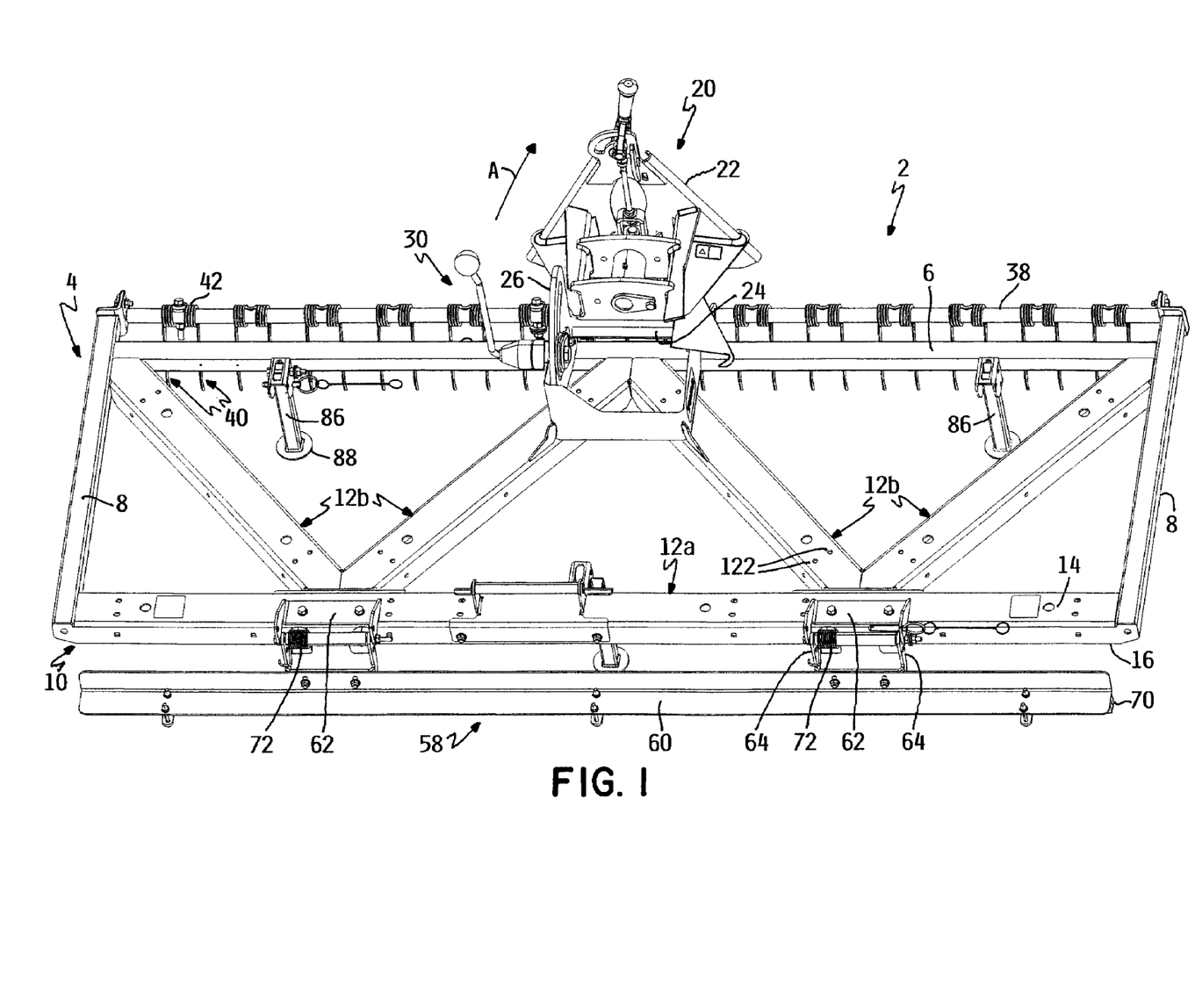
FIG. 1 is a perspective view of a turf groomer according to this invention, particularly illustrating the top side of the groomer from above and from the rear without any grooming brushes being installed thereon for the purpose of clarity.
Figure 2:
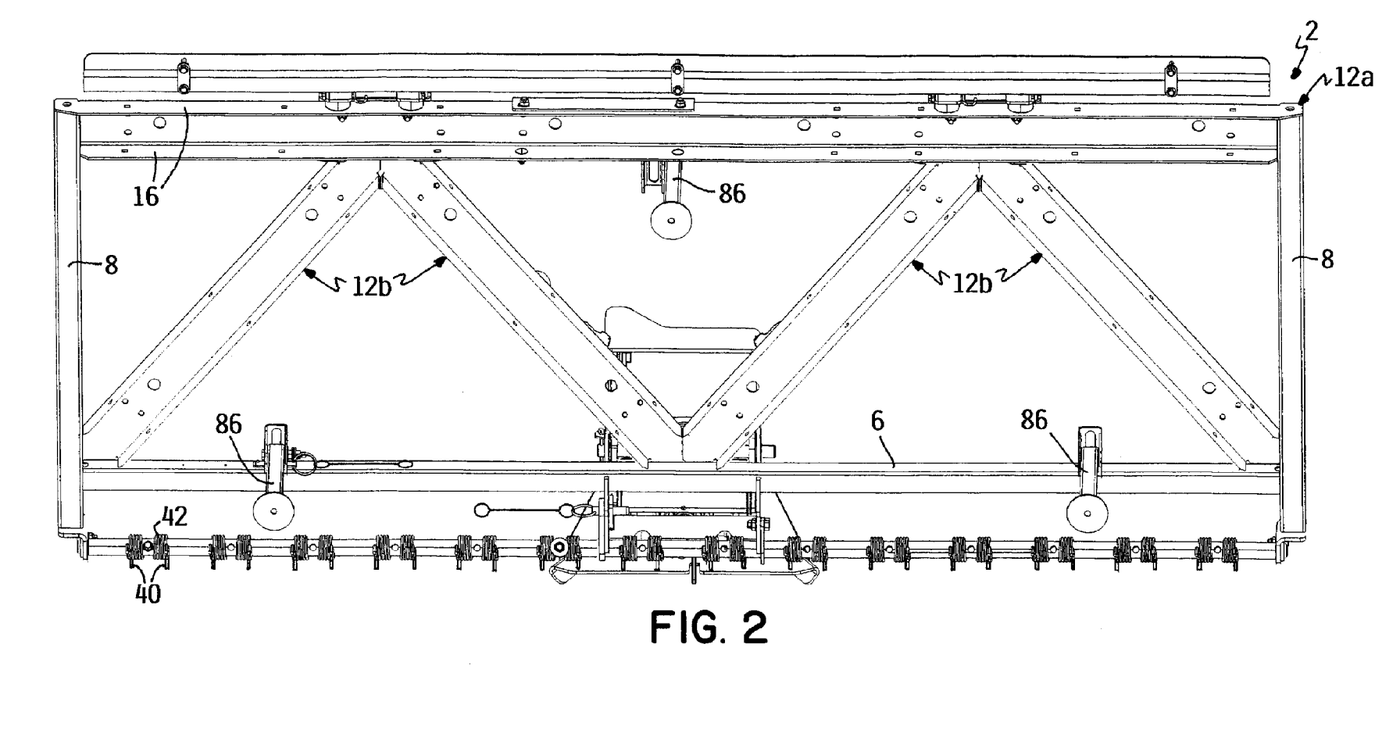
FIG. 2 is a perspective view of the groomer of FIG. 1, but showing the underside of the groomer from below and from the rear.
Figure 3:
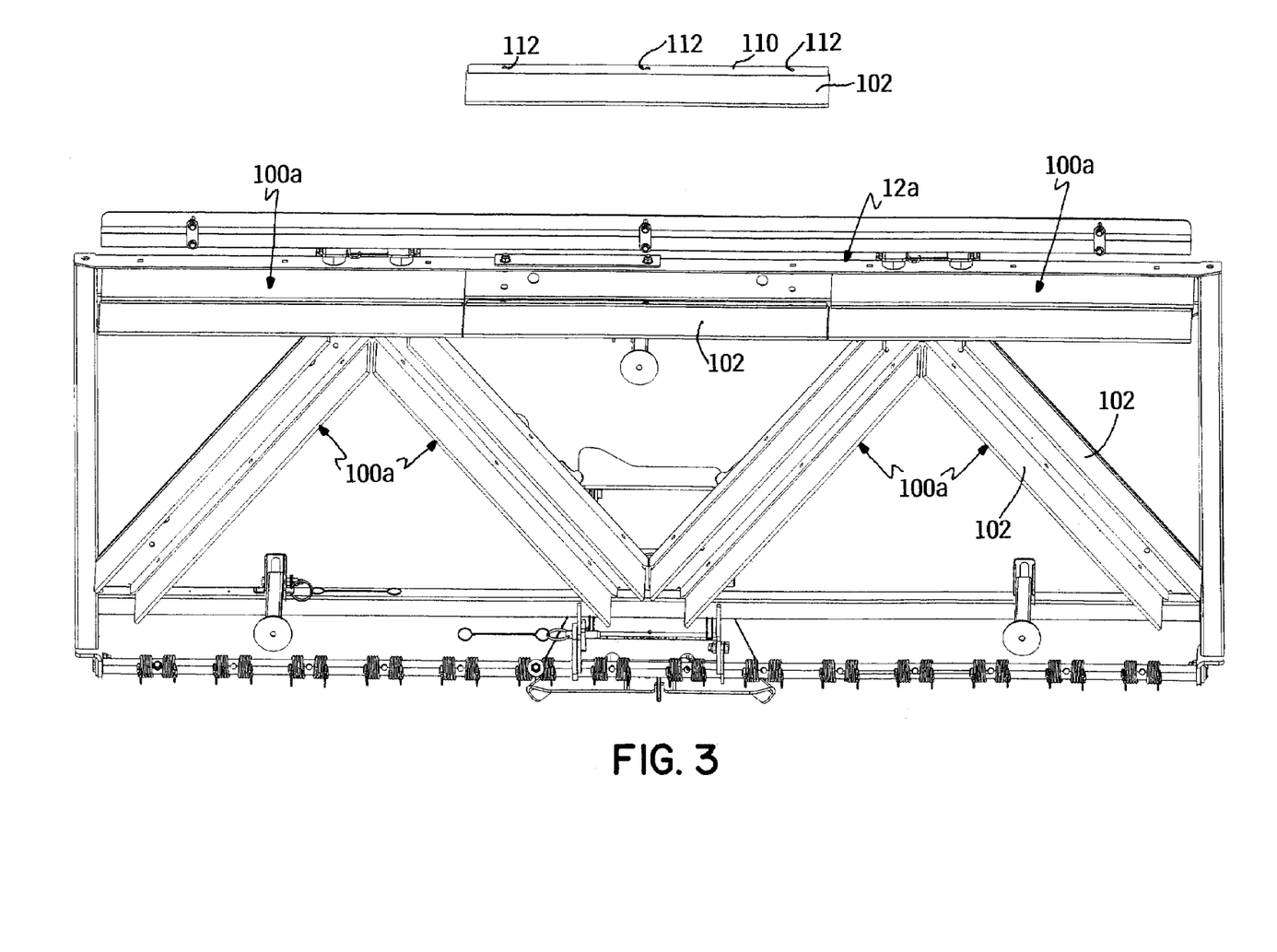
FIG. 3 is a perspective view similar to FIG. 2, but showing the groomer equipped with a plurality of grooming brushes of the type used to groom artificial turf surfaces with a portion of one brush being shown in exploded form.

Referring first to FIGS. 1 and 2, one embodiment of a turf groomer according to this invention is illustrated generally as 2. Groomer 2 includes a frame 4 that defines a plane figure. In this case, the plane figure is in the shape of a rectangle though other shapes could also be used. Groomer frame 4 includes a front rail 6, laterally spaced side rails 8, and a rear rail 10 which are integrally fixed to each other in any suitable manner. Groomer frame 4 is wider than it is long.

Front rail 6 and side rails 8 comprise substantially square tubes or beams. However, rear rail 10 comprises a downwardly facing, U-shaped channel 12a that has a top wall 14 and spaced downwardly extending side walls 16. Top wall 14 of channel 12a is wider than the tops of front rail 6 and side rails 8. Channel 12a comprises a member for holding a grooming brush, or alternatively a plurality of grooming brushes arranged end-to-end, extending across substantially the entire width of groomer frame 4.

A plurality of downwardly facing, U-shaped, brush holding channels 12b are additionally provided in the interior of groomer frame 4. Interior channels 12b extend between front and rear rails 6 and 10 of groomer frame 4 and are further preferably laterally inclined relative to the forward direction of motion of groomer frame 4. The forward direction of motion of groomer frame 4 is indicated by the arrow A in FIG. 1.

As shown in FIG. 1, there are four interior channels 12b in groomer frame 4 which are arranged in the shape of a W when viewed from behind and above groomer frame 4. The four interior channels 12b that collectively form the W shape are arranged so that the W shape extends laterally from one side rail 8 to the other side rail 8 and longitudinally between the front and rear rails 6 and 10. Greater or fewer numbers of interior channels 12b could be used and interior channels 12b could be arranged in shapes other than the W shape shown in FIG. 1. Interior channels 12b have the same shape and width as channel 12a, but are obviously much shorter in length and have mitered ends where interior channels 12b abut with portions of groomer frame 4 or with each other.

The Toro Company, the assignee of this invention, manufactures and sells a grooming vehicle (not shown) known as the Sand Pro® which can mount various attachments to the front and rear thereof using a quick attachment provided on both the front and rear ends of the vehicle. The quick attachment provided on each end of the vehicle comprises an A-shaped male coupling that is designed to nest within a similarly sized A-shaped female coupling that is provided on the attachment. Each quick attachment on each end of the vehicle has male couplings that are identical to each other to allow a given attachment to be interchangeably used on both the front and rear ends of the vehicle. Each quick attachment on each end of the vehicle is coupled to a four bar linkage and a hydraulic lift and lower device at each end of the vehicle to allow the attachment to be lifted and lowered relative to the ground.

U.S. Pat. No. 7,617,882, owned by The Toro Company, the assignee of this invention, shows a Sand Pro® grooming vehicle along with a quick attachment of the type described above on the front of the vehicle, and is hereby incorporated by reference. The quick attachment as used herein is also of the same type disclosed in Toro's U.S. Pat. No. 6,347,671, which is also incorporated by reference herein.

Groomer 2 of this invention includes a quick attachment 20 of the type known in Toro's prior products and patents as referenced above. Specifically, only the female coupling 22 of quick attachment 20 is illustrated herein with the male coupling not being shown as it is carried on the grooming vehicle. Quick attachment 20 is provided on the front of groomer frame 4 adjacent and slightly forward of front rail 6 to allow groomer 2 to be attached to the rear of a Sand Pro® type vehicle or any other suitable vehicle having the mating male coupling of the quick attachment on the rear of the vehicle. Thus, groomer 2 is towed behind the vehicle. The height of groomer frame 4 relative to the ground can be infinitely adjusted through the hydraulic lift and lower device that is provided on the vehicle for lifting and lowering quick attachment 20.

Figure 7:
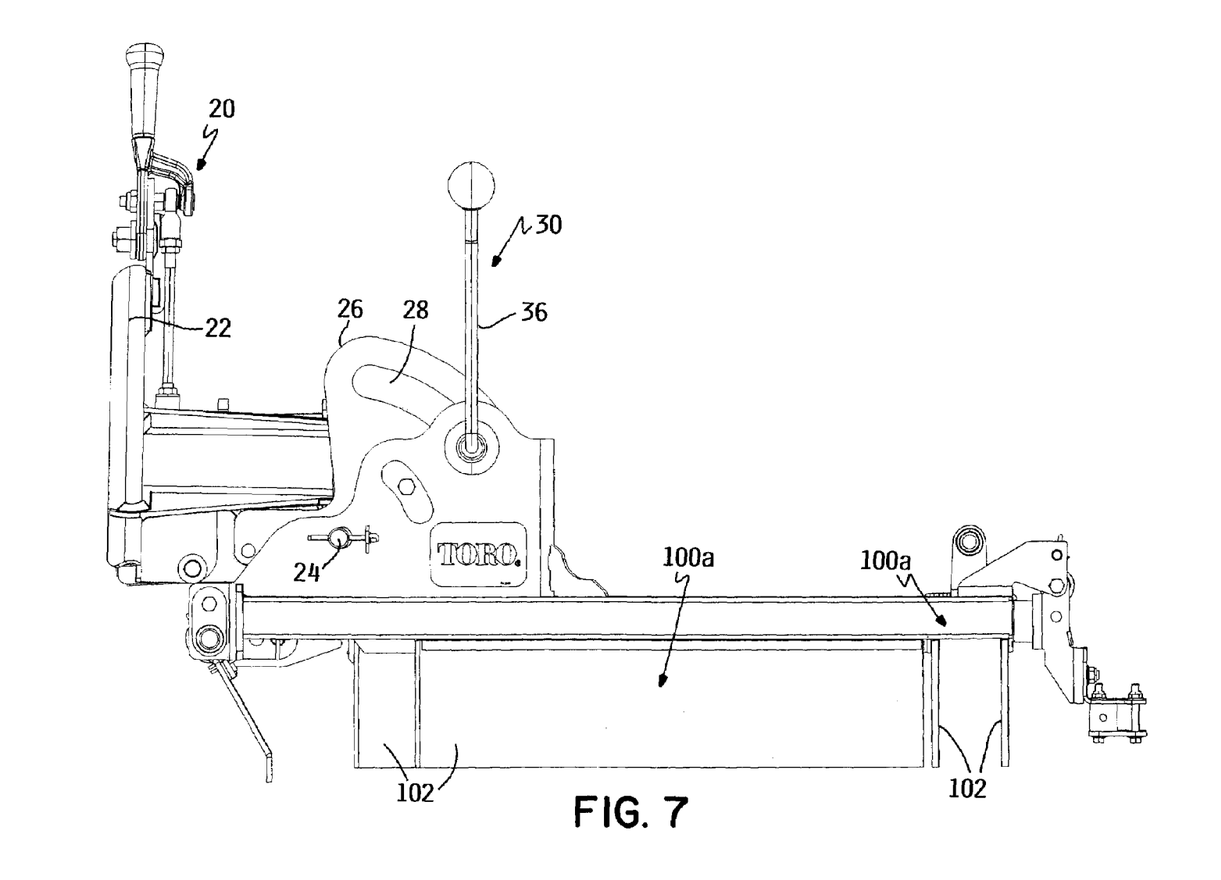
FIG. 7 is a side elevational view similar to FIG. 6, but showing the groomer equipped with the artificial turf style grooming brushes.
Figure 8:
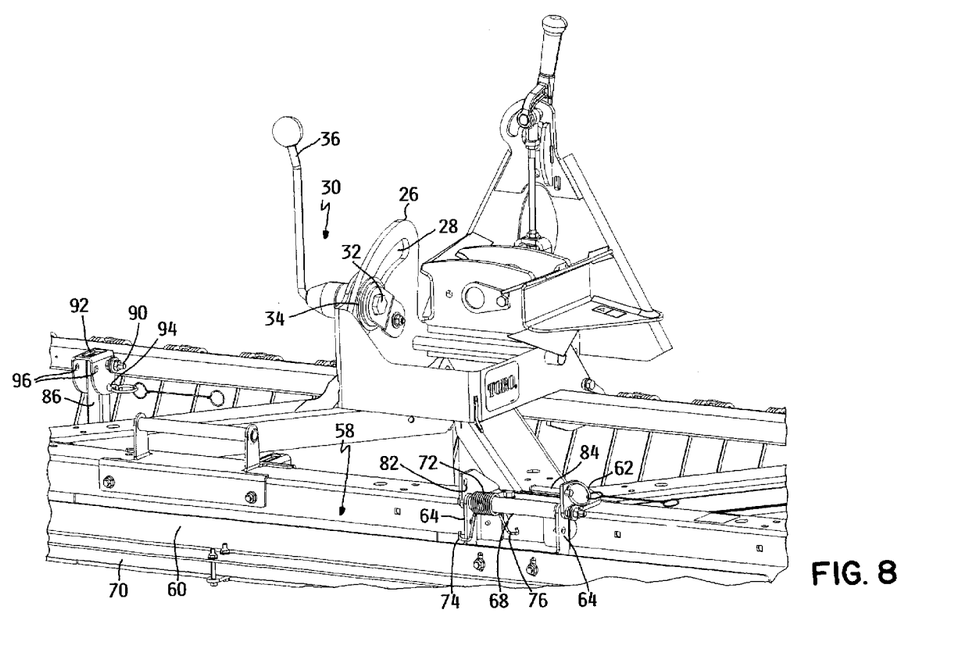
FIG. 8 is an enlarged perspective view of a portion of the groomer of FIG. 1, particularly illustrating the friction lock for adjusting the horizontal attitude of the groomer, the upper end of one of the legs of the groomer and the bracket in which that end is pivotally journalled, and the pivot structure for the debris removal device at the rear of the groomer.

Groomer frame 4 is pivotal about a horizontal pitch axis 24 relative to quick attachment 20 to permit groomer frame 4 to be selectively and manually pitched or tilted relative to the ground to be either substantially horizontal, or tail down, or tail up, etc. Referring to FIGS. 7 and 8, quick attachment 20 includes a lock plate 26 having an arcuate slot 28 that is curved upwardly and forwardly. A friction lock 30 carried on groomer 2 has a pin 32 extending through slot 28 in lock plate 26 and includes at least one friction disc 34 that can be tightened against the sides of lock plate 26 to hold groomer frame 4 in an adjusted position. Friction lock 30 includes a handle 36 that can be rotated in one direction to release friction disc 34 from lock plate 26 to allow adjustment of groomer frame 4 or that can be rotated in an opposite direction to tighten or clamp friction disc 34 of friction lock 30 against lock plate 26 to hold groomer frame 4 in an adjusted position. The reasons for why a user would adjust the horizontal pitch attitude of groomer frame 4 relative to the ground will be discussed in more detail hereafter.

Figure 5:
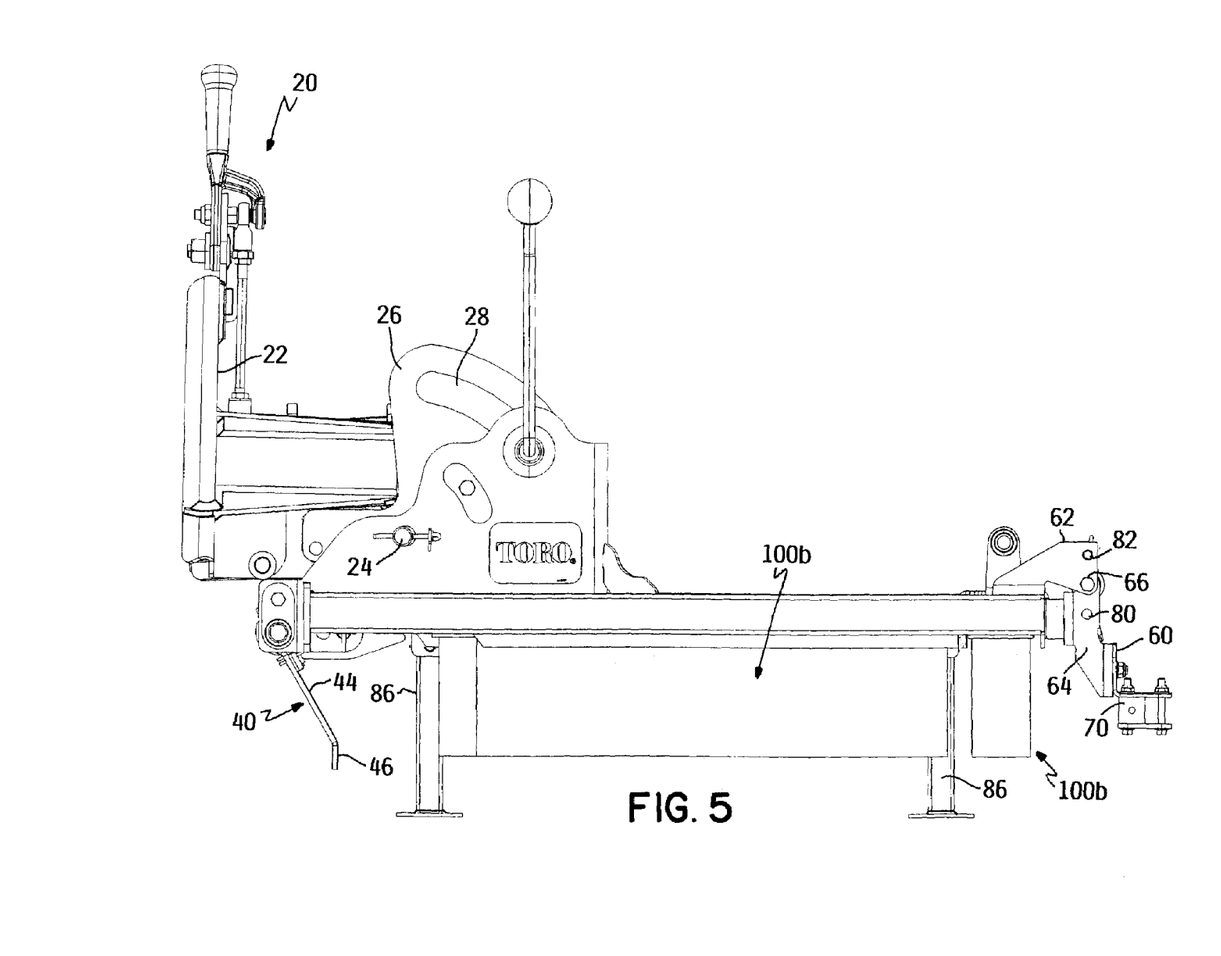
FIG. 5 is a side elevational view of the groomer shown in FIG. 4, with the legs of the groomer being deployed in their vertical position for supporting the groomer on the ground in a raised, non-operative storage position.
Figure 6:
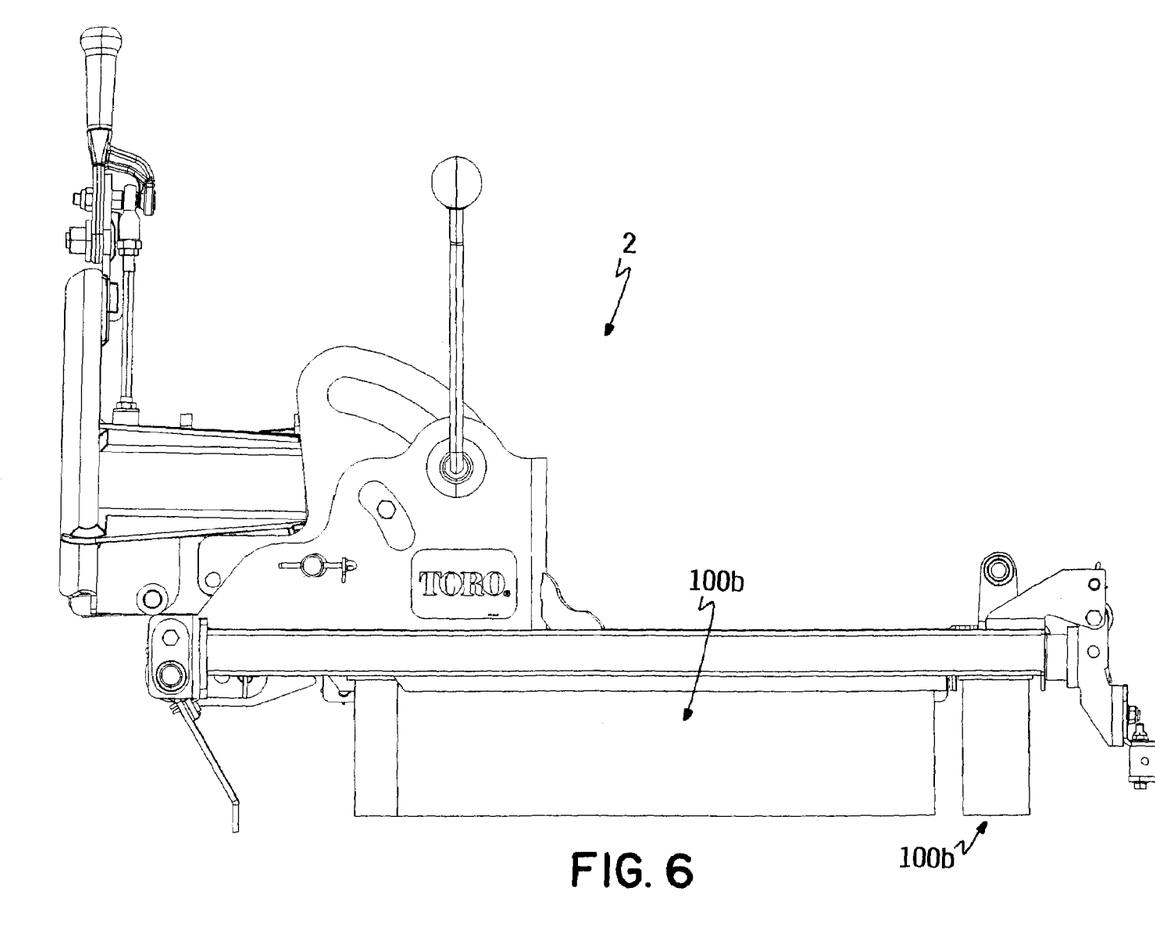
FIG. 6 is a side elevational view similar to FIG. 5, but with the legs of the groomer having been rotated upwardly into the interior of the groomer frame to be deployed in a horizontal out of use position such that the groomer can have the grooming brushes and scarifying spring tines come into engagement with the ground.

Side rails 8 of groomer frame 4 have forward extensions which serve to rotatably journal a shaft 38 that carries a plurality of spring tines 40 used for scarifying the turf surface. Spring tines 40 are provided in separate pairs that depend from a coil 42 that is slipped onto shaft 38 with coil 42 being bolted in place on shaft 38. The various pairs of spring tines 40 are spaced across the length of shaft 38, and thus across the width of groomer frame 4, generally equally from side to side as shown. Referring to FIGS. 5-7, when spring tines 40 are in use, tines 40 comprise a relatively long, downwardly and rearwardly extending leg 44 with a much shorter, forwardly bent, and substantially vertical tip 46. The bottoms of spring tines 40 including the forwardly bent tips 46 thereof can engage down into a desired depth into the turf surface to scratch against the turf surface for a purpose to be described hereafter.

Figure 10:
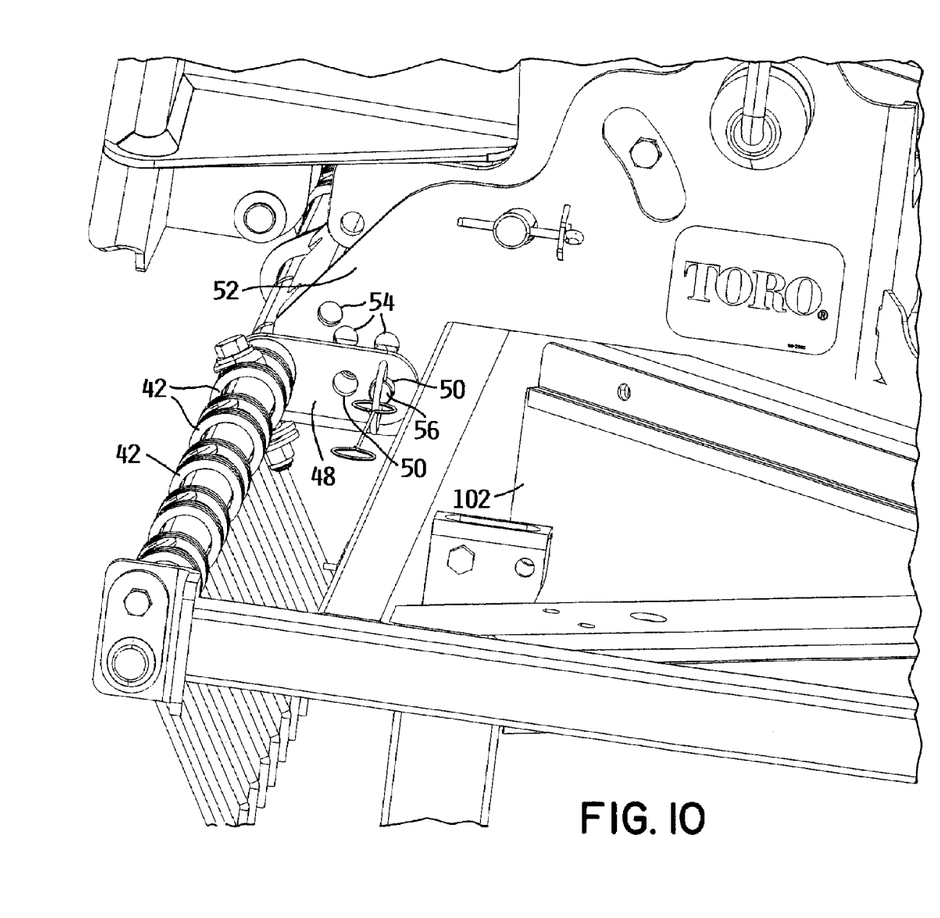
FIG. 10 is an enlarged perspective view of a portion of the groomer of FIG. 1, particularly illustrating the latch structure for holding the scarifying spring tines in a plurality of adjusted positions.
Figure 11:
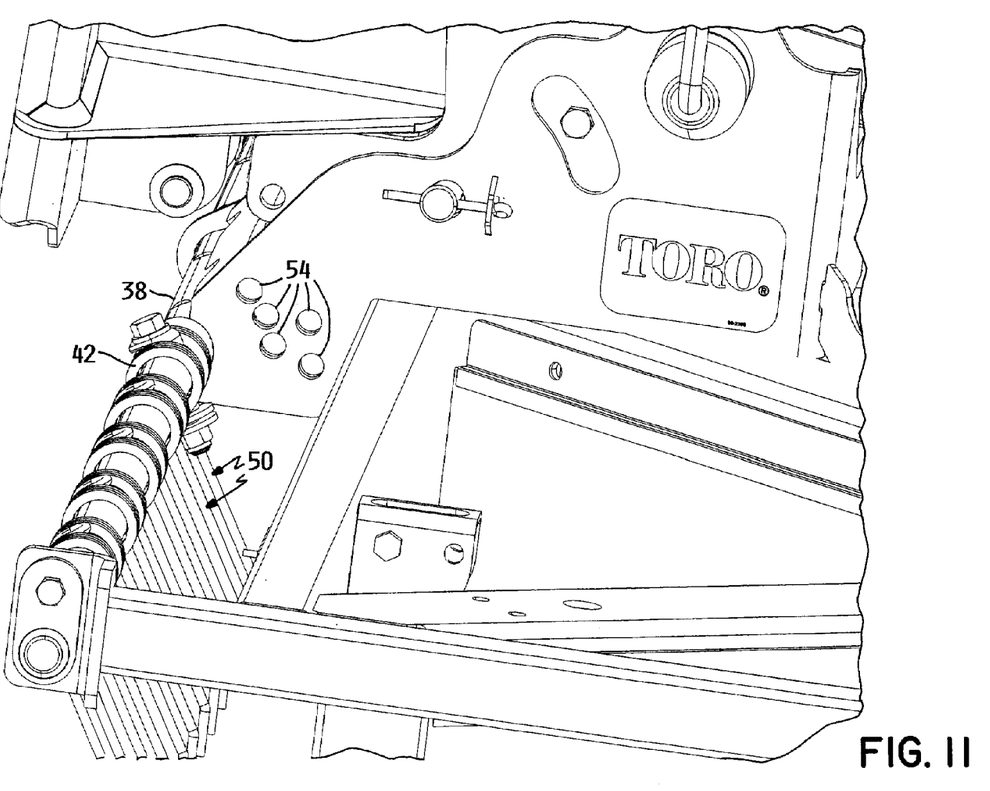
FIG. 11 is a perspective view similar to FIG. 10, but with a portion of the latch structure removed to show the plurality of adjustment holes in the frame of the groomer.

The angle and height of spring tines 40 relative to the turf surface can be adjusted as desired by an operator. As shown in FIG. 10, shaft 38 that mounts spring tines 40 carries a rearwardly extending latch plate 48 having a pair of openings 50. Latch plate 48 is positioned adjacent an adjustment plate 52 on groomer frame 4. As best shown in FIG. 11, adjustment plate 52 carries a plurality of adjustment holes 54 disposed in an arcuate front row and an arcuate rear row. The forward opening 50 is positioned to register with any of the holes 54 in the front row and the rearward opening 50 is positioned to register with any of the holes 54 in the rear row. The reason for two openings 50 and two rows of holes 54 is to provide more increments of adjustment than if a single opening 50 and a single row of holes 54 is used.

A given opening 50 in latch plate 48 can be aligned with a selected adjustment hole 54 in one of the two rows of holes 54. A latch pin 56 can then be inserted through the given opening 50 in latch plate 48 and through the selected adjustment hole 54 on groomer frame 4. Thus, the height and angle of spring tines 40 relative to the turf surface is variable depending upon which opening 50 and which hole 54 receives latch pin 56. If the uppermost adjustment hole 54 in the front row is used, spring tines 40 will be rotated far enough upwardly so that they will be held up out of engagement with the turf surface to be thereby disposed in an inoperative position.

Figure 9:
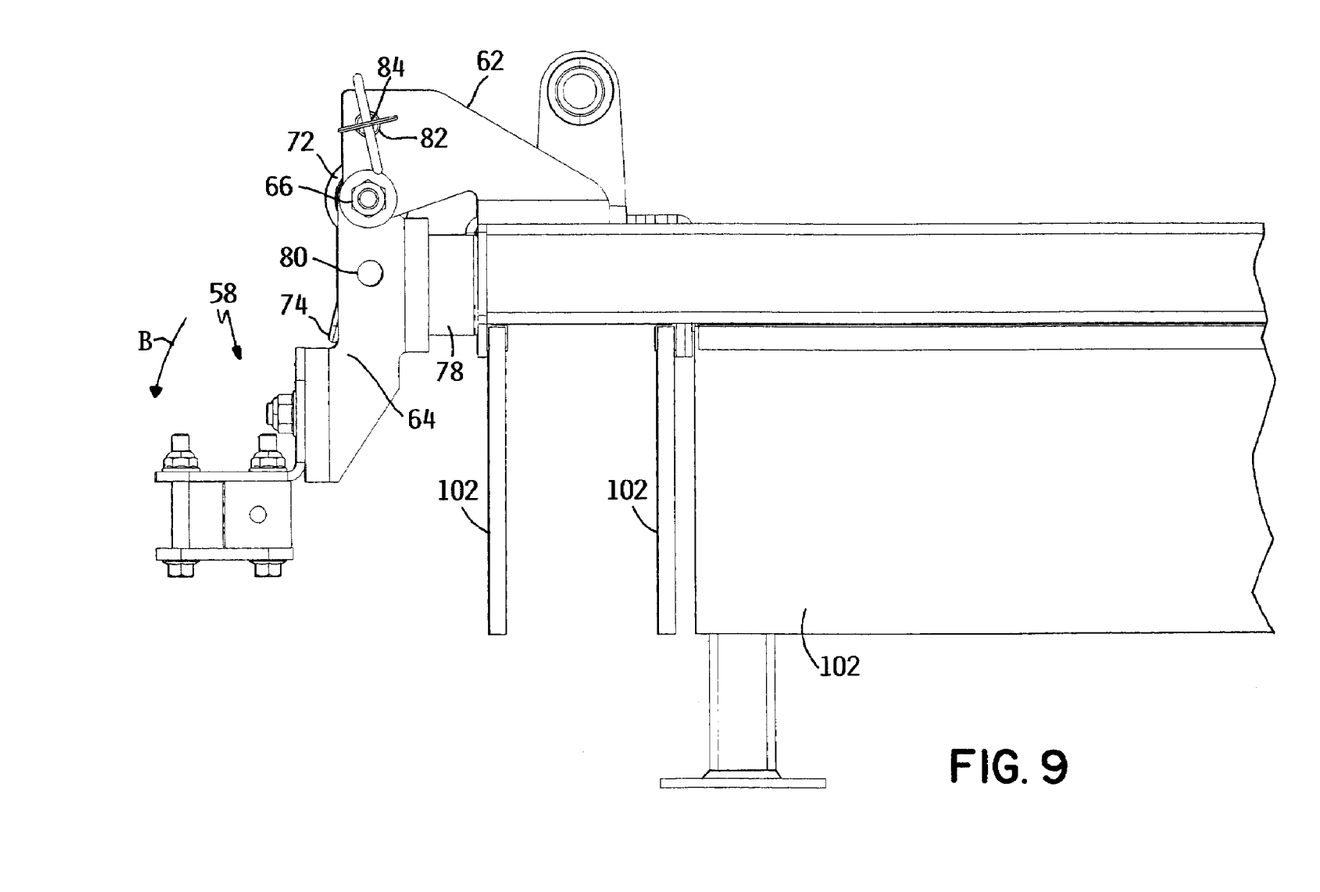
FIG. 9 is an enlarged side elevational view of the pivot structure for the debris removal device at the rear of the groomer.

Referring to FIGS. 1, 8 and 9, a metallic debris remover 58 is attached to the rear of groomer frame 4. Debris remover 58 comprises an L-shaped flange 60 pivotally mounted to rear rail 10 of groomer frame 4 by a pair of mounting brackets 62 that extend rearwardly from rear rail 10. Flange 60 has two pairs of upwardly extending mounting arms 64 that are pivotally secured to opposite sides of brackets 62 for pivoting about a pivot axis 66 formed by a pivot pin 68. An elongated magnet 70 is clamped to the underside of flange 60 and extends substantially across the width of the rear of groomer frame 4. When debris remover 58 is in use, magnet 70 is close enough to the turf surface to attract, pick up, and hold thereon any metallic debris, such as bolts, nails, metal fragments, etc., that might be present in the turf surface.

As best shown in FIG. 8, a torsion spring 72 is received around pivot pin 68 and has one end 74 that bears against one of the mounting arms 64 on flange 60. Another end 76 of torsion spring 72 simply bears against the back face of rear rail 10 of groomer free. As shown in FIG. 9, torsion spring 72 is biased to rotate flange 60 in a first direction about pivot axis 66, as indicated by the arrow B in FIG. 9, to normally bias debris remover into a lowered, operative position. Torsion springs 72 prevent damage to debris remover 58 and magnet 70 should debris remover 58 strike some obstruction in the turf surface. If this happens, debris remover 58 can rotate upwardly about pivot pins 68 to allow the obstruction to pass. When the obstruction has passed, torsion springs 72 will return debris remover 58 to its usual lowered position. A plurality of resilient bumpers or cushions 78 can be placed on the back face of rear rail 10 to cushion debris remover 58 as it returns to its usual operative position under the influence of torsion springs 72.

Debris remover 58 can be selectively and manually disposed in a raised, non-operative cleaning position (not shown) in which debris remover 58 has been flipped up approximately 180° from the position shown in the drawings. In this cleaning position, magnet 70 faces upwardly and is accessible from above. Debris remover 58 has an opening 80 provided in each mounting arm 64. Openings 80 in mounting arms 64 can be aligned with a pair of holes 82 in the mounting bracket 62 to which mounting arms 64 are pivotally coupled. A latch pin 84 can be selectively inserted through at least one set of aligned openings and holes 80 and 82 to hold debris remover 58 in the cleaning position thereof. In this cleaning position, a user can pick off or scrape off or otherwise remove the accumulated debris that is being held on magnet 70 from magnet 70. This cleaning step of removing accumulated debris from magnet 70 can be done periodically. While torsion springs 72 will be further wound up or tensioned as debris remover 58 is flipped up into its cleaning position, springs 72 are not so strong as to prevent movement of debris remover 58 into its cleaning position.

Groomer frame 4 includes a plurality of spaced, downwardly extending legs 86 with enlarged feet 88 for engaging the ground. Each leg 86 is generally identical having an upper end that is pivotally journalled by a pivot pin 90 within a bracket 92 carried on groomer frame 4. See FIG. 8. As shown in FIGS. 5-7, all of the legs 86 can be disposed in a vertical, weight bearing position in which the feet 88 of legs 86 engage the ground and support groomer frame 4 and all of the structure carried thereon above the ground in a storage position. Referring again to FIG. 8, a latch pin 94 can hold or lock each leg 86 within its bracket 92 in its vertical, weight bearing position. Legs 86 are spaced apart on groomer frame 4 to provide at least three points of contact with the ground spaced over the plane figure defined by the shape of groomer frame 4. Thus, as shown in FIG. 1, there are three legs 86 carried on the front and rear rails of groomer frame 4 in a triangular configuration, though the number of legs 86 and their configuration on groomer frame 4 can vary.

Legs 86 are used only for supporting groomer frame 4 when it is not in use and is being stored. To use groomer 2, a user or operator can back the towing vehicle up to groomer frame 4 while it is being supported by legs 86 and then attach quick attachment 20. Once groomer frame 4 is supported on the vehicle by the hydraulically operated quick attachment 20 such that it can be lifted and lowered by quick attachment 20, legs 86 can be folded up into a substantially horizontal position in which legs 86 are contained within the interior spaces of groomer frame 4. This can be done by pulling latch pin 94 holding each leg in its vertical position, manually pivoting each leg 94 upwardly by 90° until the openings in the leg become aligned with a pair of second holes 96 provided in bracket 92, and then reinserting latch pin 94 through the aligned openings and holes 96 to latch or hold each leg 86 in its raised, substantially horizontal position. When legs 86 have been folded up in this manner, groomer 2 is ready for a grooming operation with the grooming brushes and scarifying spring tines in engagement with the turf surface.

Turning now to the matter of the brushes that can be attached to groomer frame 4, there are two types of brushes, namely brushes 100a and brushes 100b, that are alternatively used on groomer frame 4 depending upon whether one is grooming a natural turf surface or an artificial turf surface. The brushes 100a employed on groomer frame 4 for grooming an artificial turf surface, and the operation of groomer 2 when grooming an artificial turf surface, will be described first.

Figure 12:
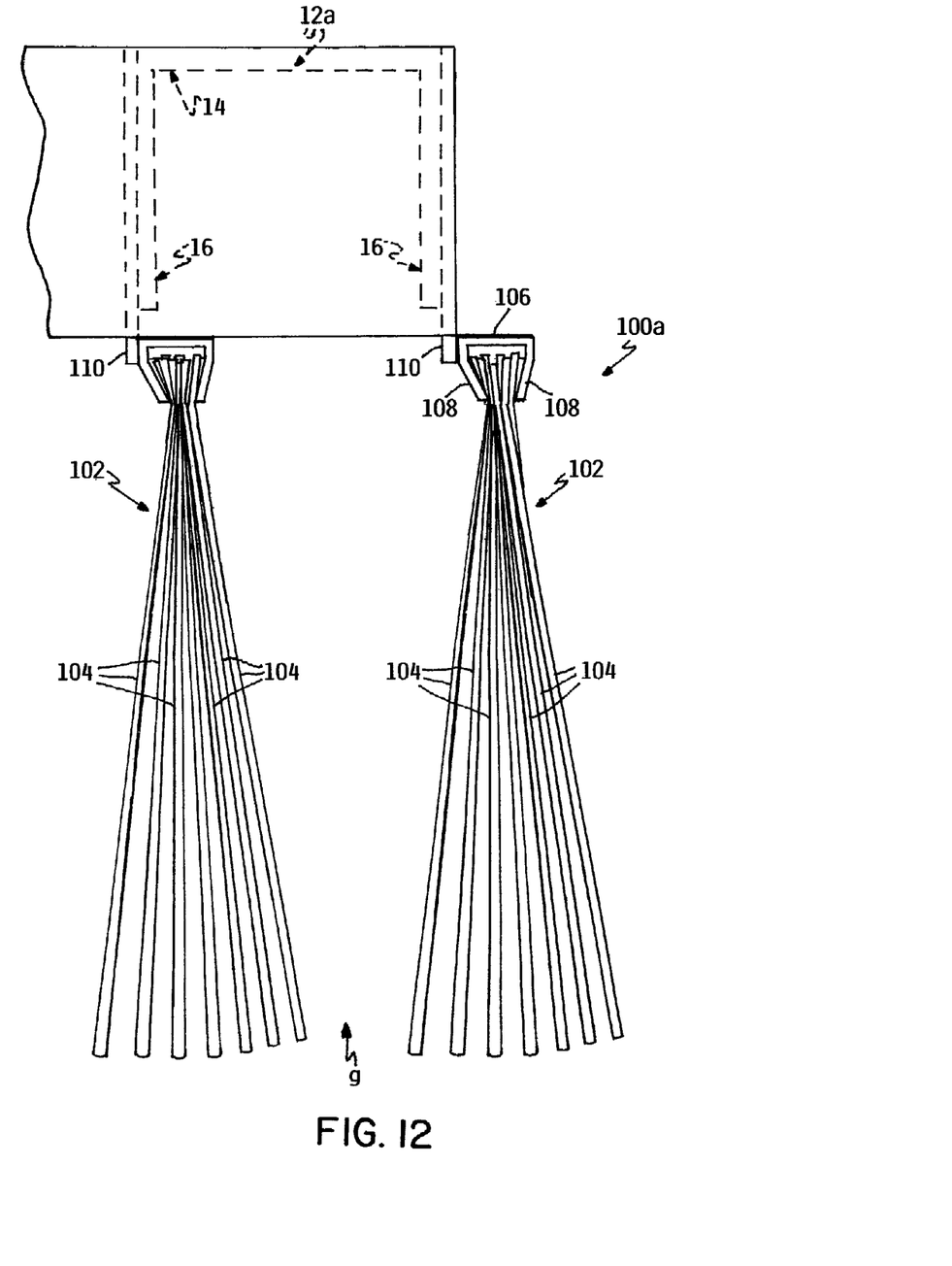
FIG. 12 is a side elevational view of the end of one of the grooming brushes used for grooming artificial turf surfaces, such grooming brush having first and second brush walls separated by a gap therebetween.

Referring now to FIG. 12, when groomer 2 is configured for use on an artificial turf surface, the brushes 100a used on each brush holding channel 12 of groomer frame 4 comprise a pair of spaced brush walls 102 disposed on or adjacent the opposite side walls 16 of each channel 12. Each brush wall 102 comprises a substantially single row of brush bristles 104 with the top ends of brush bristles 104 being clamped within a U-shaped clamp 106 having inwardly chamfered lower edges 108. Edges 108 of clamp 106 can be bent or chamfered inwardly after the top ends of the row of brush bristles 104 have been inserted therein to securely affix brush bristles 104 to clamp 106. When so clamped, the row of bristles 104 forming brush wall 102 will have some bristles that are slightly forward or behind adjacent bristles 106, namely the top ends of bristles 104 are not strictly in a linear side-by-side alignment within clamp 106, and bristles 104 will fan out slightly as they extend downwardly from clamp 106 as shown in FIG. 12. Preferably, brush bristles 104 have a round cross-sectional shape, are between 4 and 5 inches long, are made of polyester, and have a diameter of 0.075 inches to be fairly stiff. For the purpose of clarity in the drawings and except for FIG. 12, brush walls 102 are shown diagrammatically in the drawings in a planar, block diagram form in which individual bristles 104 are not illustrated. Brush walls 102 are depicted more realistically only in FIG. 12.

Clamp 106 holding each brush wall 102 is attached to a substantially planar mounting flange 110 having a plurality of mounting holes 112 spaced along the length of flange 110. Holes 112 are provided so that brush wall 102 can be bolted to one of the downwardly extending side walls 16 of a channel 12. Thus, and as shown in FIG. 12, each brush 100a carried within a channel 12 comprises a first brush wall secured to one side wall 16 of channel 12 and a second brush wall secured to the opposite side wall 16 of channel 12. Since channel 12 has a width of three to four inches or so, this means that the brush walls 102 of each brush 100a attached to channel 12 will be separated by a gap g of at least an inch or two, or about half the width of channel 12. A single brush 100a (namely a pair of spaced brush walls 102 on opposite sides of channel 12) is used in each interior channel 12b. Multiple brushes 100a of this type, namely three such brushes 100a, are used in channel 12 forming rear rail 10 of groomer 2 due to the substantially longer length of channel 12a.

The Applicants have discovered that the design of brush 100a substantially improves the performance of groomer 2 when grooming artificial turf as it allows the infill material of the artificial turf to more easily redistribute itself and level itself out than would occur if a more conventional brush were used that was packed with brush bristles across the entire width of the brush. Here, brushes 100a are discontinuous across their width and comprise a first thin brush wall 102, an open gap g, and then a second thin brush wall 102 a few inches behind open gap g. This is essentially a pair of curtains or walls 102 of brush bristles 104 that hang down from each side wall of channel 12 but with nothing hanging downwardly from the interior of channel 12. This brush configuration has been found by the Applicants to work well when grooming artificial turf.

In addition, the ability of the user or operator to adjust the horizontal attitude of groomer frame 4 relative to the ground further enhances performance of groomer 2 on artificial turf. The Applicants have discovered that the infill material in the artificial turf can over time become substantially removed from one area, creating a deep depression, and substantially mounded in another area, creating a relatively large bump or mound. In such severe conditions, the user can unlock groomer frame 4 using friction lock 30 and tilt the tail or rear rail 10 of groomer frame 4 downwardly towards the ground into a tail down configuration. This will put more downpressure on the artificial turf when groomer 2 is towed over the turf to help redistribute the infill material from the high spots to the low spots during grooming.

Another performance enhancing aspect of groomer 2 in artificial turf is the row of scarifying spring tines 40 carried on groomer frame 4 in advance of any of the brushes 100a. In artificial turf, the Applicants have discovered that this stirs up the infill material somewhat and breaks up any small clumps of infill material to better allow the trailing brushes 100a to redistribute such infill material, to move such infill material around, and ultimately to thereby level such infill material. The operator can adjust the aggressiveness of spring tines 40 in engaging the infill material by using the series of adjustment holes 54 to vary the angle of inclination of spring tines 40, with the spring tines 40 being more aggressive in more vertical orientations and less aggressive in less vertical orientations. In some conditions of the artificial turf, such scarifying spring tines 40 may not be needed at all and spring tines 40 could be raised into a non-operative position as described previously. Alternatively, scarifying spring tines 40 could be sold as an optional attachment to a base groomer that would be sold without the scarifying spring tines 40.

The operation of debris remover 58 has been described previously. This is also quite useful, though optional, when groomer 2 is configured with the brushes 100*a* having spaced brush walls 102 and when groomer 2 is being used to groom artificial turf. As groomer 2 is moved over the artificial turf, magnet 70 will be positioned low enough to attract and pull up metallic debris out of the turf with such debris sticking to magnet 70. Periodically, the user can flip debris remover 58 up to raise magnet 70 to allow magnet 70 to be cleaned of such debris. Removal of this type of debris from the artificial turf enhances the safety of those who use the artificial turf and decreases the likelihood of injuries arising from contact with such debris. Debris remover 58 is also usable for removing metallic debris from natural turf surfaces. Again, debris remover 58 could be sold as an optional attachment for groomer 2.

Groomer 2 of this invention is likely to have its widest application for grooming artificial turf. However, it is not restricted to that use. Groomer 2 can be quickly and easily converted to use on natural turf by removing the brushes 100*a* comprising the spaced brush walls 102 and by then replacing these brushes 100*a* with conventional brushes 100*b* of the type often found on push brooms used to clean garage floors or driveways.

Figure 4:
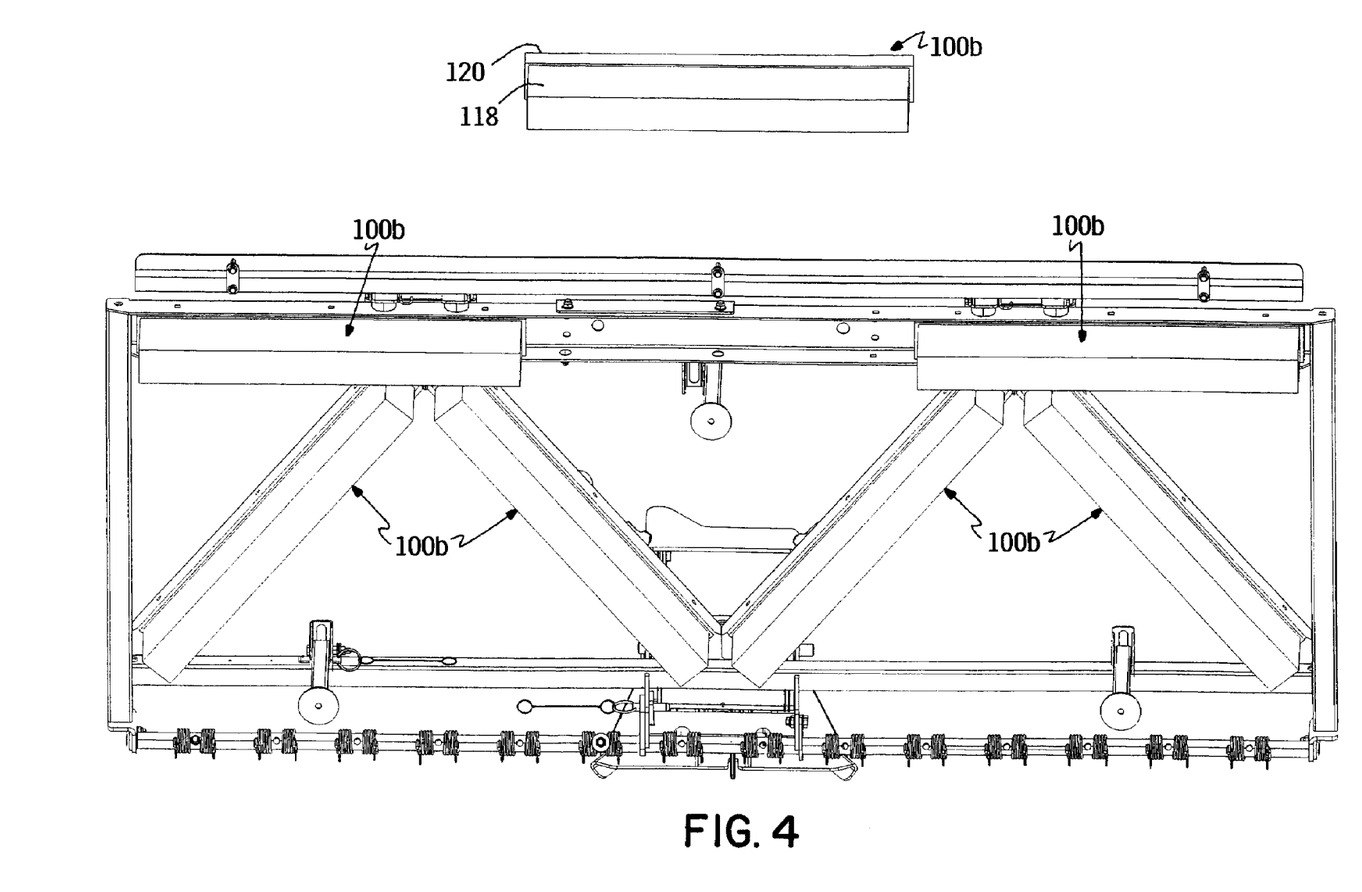
FIG. 4 is a perspective view similar to FIG. 2, but showing the groomer equipped with a plurality of grooming brushes of the type used to groom natural turf surfaces with one brush being shown in exploded form.

Groomer 2 as shown in FIGS. 4-6 is one which has been converted to use on natural turf. Conventional push broom type brushes 100*b* comprising a wooden or plastic head 120 having bristles 118 (shown as a block 118) tightly packed across both the length and width of head 120 are now used. Brushes 100*b* are secured to channels 12 merely by inserting the brushes up into the interior of channels 12 between the side walls 16 of channels 12 until the heads 120 of the brushes abut against the underside of the top walls 14 channels 12. Brushes 100*b* can then be bolted to channels 12 using fasteners that extend upwardly from heads 120 through holes 122 in the top walls 14 of channels 12. With this simple conversion, removing one set of brushes 100*a* and replacing them with a set of differently styled brushes 100*b*, groomer 2 can do double duty—grooming both natural and artificial turf surfaces. This avoids the expense of having two dedicated, single use groomers on hand.

Various modifications of this invention will be apparent to those skilled in the art. Accordingly, the scope of this invention is to be limited only by the appended claims.

The invention claimed is:

1. A groomer for use in grooming an artificial turf surface having a backing material that is laid atop the ground with the backing material having upstanding ribbons of artificial fibers that resemble blades of grass, the backing material having granular or particulate infill material placed atop the backing material to substantially fill in the spaces between the artificial fibers, which comprises:
    (a) a groomer frame which is movable over the artificial turf surface to traverse the artificial turf surface, the groomer frame having a front and a rear taken with respect to a forward direction of motion of the groomer frame over the artificial turf surface;
    (b) at least one grooming brush carried on the groomer frame in a substantially static manner and depending downwardly from the groomer frame with the grooming brush during a grooming operation extending down at least partially into and substantially continuously engaging with the infill material of the artificial turf surface as the groomer frame traverses the artificial turf surface during the grooming operation, wherein the grooming brush extends at least partially laterally relative to the forward direction of motion of the groomer frame, and wherein the grooming brush comprises:
        (i) a first brush wall comprising a substantially single row of brush bristles with top ends of the brush bristles being substantially closely packed together and with lower portions of the brush bristles fanning out as the brush bristles extend downwardly from their packed together top ends; and
        (ii) a second brush wall which is substantially identical to the first brush wall and which is parallel to but spaced away from the first brush wall by a gap, wherein the gap between the brush walls is large enough so that the first and second brush walls act substantially independently of one another on the infill material.

2. The groomer of claim 1, wherein the first and second brush walls of the grooming brush are carried from a common structural member of the groomer frame.

3. The groomer of claim 2, wherein the common structural member comprises an elongated, downwardly facing, U-shaped channel having a pair of spaced apart, opposed side walls joined together by a top wall, and wherein the first brush wall is carried by one side wall of the channel and the second brush wall is carried by the opposite side wall of the channel.

4. The groomer of claim 3, wherein the top wall of the channel is devoid of any brush bristles so that the only brush bristles carried by the channel are those contained in the first and second brush walls carried on the side walls of the channel.

5. The groomer of claim 1, wherein the groomer frame has a coupling at the front thereof for connection to a towing vehicle such that the groomer frame can be towed over the artificial turf surface, and wherein the groomer frame is pivotally adjustable about a horizontal pitch axis relative to the coupling to allow the groomer frame to have different horizontally pitched attitudes relative to the artificial turf surface.

6. The groomer of claim 5, wherein a selectively releasable lock is provided to hold the groomer frame relative to the coupling in an adjusted position corresponding to a selected horizontally pitched attitude, wherein the lock comprises:
    (a) a lock plate carried on one of the coupling or the groomer frame;
    (b) a friction lock carried on the other of the coupling or the groomer frame and cooperable with the lock plate, the friction lock having a manually rotatable handle and at least one friction disc, wherein the handle is rotatable in one direction for releasing the friction disc from tight engagement with the lock plate to permit the groomer frame to pivot relative to the coupling and is rotatable in an opposite direction for tightening the engagement between the friction disc and the lock plate to prevent pivoting motion of the groomer frame relative to the coupling.

7. The groomer of claim 5, further including a row of scarifying spring tines on the front of the frame in advance of the grooming brush, wherein the scarifying spring tines have bottom portions that reach into and scratch or scrape the infill material prior to the infill material being acted on by the grooming brush.

8. The groomer of claim 7, wherein the spring tines have a downwardly and rearwardly extending inclined lower portion with a forwardly bent tip.

9. The groomer of claim 8, wherein the row of spring tines is adjustable so that the inclined lower portions of the spring tines can be adjusted to different inclinations relative to the artificial turf surface to vary the aggressiveness of the spring tines on the infill material.

10. The groomer of claim 7, further including a metallic debris remover comprising an elongated magnet pivotally carried on the rear of the groomer frame, wherein the metallic debris remover is spring biased towards the artificial turf surface such that the magnet is usually disposed in a lowered, operative position in which it is close enough to the artificial turf surface to attract, pick up and retain metallic debris present in the turf surface, thereby to remove such debris from the turf surface.

11. The groomer of claim 1, further including a row of scarifying spring tines on the front of the frame in advance of the grooming brush, wherein the scarifying spring tines have bottom portions that reach into and scratch or scrape the infill material prior to the infill material being acted on by the grooming brush.

12. The groomer of claim 1, further including a metallic debris remover comprising an elongated magnet pivotally carried on the rear of the groomer frame, wherein the metallic debris remover is spring biased towards the artificial turf surface such that the magnet is usually disposed in a lowered, operative position in which it is close enough to the artificial turf surface to attract, pick up and retain metallic debris present in the turf surface, thereby to remove such debris from the turf surface.

13. The groomer of claim 12, wherein the metallic debris remover may be flipped up into a raised, non-operative, cleaning position in which the magnet is accessible from above to allow an operator to clean off the metallic debris clinging to the magnet.

14. The groomer of claim 13, wherein the spring biasing on the debris remover is increased as the debris remover is moved to the cleaning position thereof but is not increased so much as to prevent an operator from manually lifting and flipping the debris remover into the cleaning position.

15. The groomer of claim 14, further including a latch for holding the debris remover in its cleaning position.

16. The groomer of claim 1, wherein the groomer frame includes a plurality of selectively deployable ground engaging legs having a substantially vertical position in which the legs support the groomer frame on the ground in an elevated non operative position with the grooming brush held up out of substantial contact with the artificial turf surface.

17. The groomer of claim 16, wherein the legs pivot to a substantially horizontal position within the groomer frame allowing the groomer frame to be lower relative to the ground with the grooming brush in operative engagement with the artificial turf surface.

18. The groomer of claim 1, wherein the groomer frame carries a plurality of the grooming brushes thereon with the plurality of brushes being arranged in an array that collectively grooms an unbroken swath of the artificial turf surface that is substantially as wide as the groomer frame during a single pass of the groomer frame over the turf surface.

19. The groomer of claim 18, wherein the array of grooming brushes includes at least one grooming brush extending laterally across substantially the entire rear of the groomer frame to cover substantially the entire width of the groomer frame, and a plurality of grooming brushes placed in an interior of the groomer frame in advance of the rear of the groomer frame with the interior grooming brushes extending both longitudinally and laterally relative to the forward direction of motion of the groomer frame.

20. A groomer which is convertible for grooming both a natural turf surface and an artificial turf surface, wherein the natural turf surface comprises soil or dirt with an upper layer of growing natural grass, and wherein the artificial turf surface has a backing material that is laid atop the ground with the backing material having upstanding ribbons of artificial fibers that resemble blades of grass, the backing material having granular or particulate infill material placed atop the backing material to substantially fill in the spaces between the artificial fibers, which comprises:
  (a) a groomer frame which is movable over the artificial turf surface to traverse the turf surface, the groomer frame comprising a plurality of elongated structural members that are fixedly secured to one another to define a rigid plane figure, wherein the structural members include at least one downwardly facing U-shaped channel having a pair of spaced apart, opposed side walls joined together by a top wall with the space between the side walls defining a width of the at least one channel;
  (b) at least one first grooming brush carried on the at least one channel of the groomer frame for use in grooming the artificial turf surface;
  (c) at least one second grooming brush that can be installed on the at least one channel of the groomer frame in place of the at least one first grooming brush for use in grooming the natural turf surface; and
  (d) wherein the first and second grooming brushes have different configurations of brush bristles, each second grooming brush being in the style of a push broom with bristles closely packed across both a length and width of the brush such that the bristles thereby substantially fill in the width of the channel along the length of each second grooming brush, and each first grooming brush having bristles closely packed across the length thereof but with such bristles being placed only in two curtains or walls of bristles that extend downwardly adjacent the opposite side walls of the at least one channel with the width of the at least one channel lying between the two curtains or walls of brush bristles being substantially completely open and free of brush bristles.

* * * * *